Patented Sept. 11, 1951

2,567,802

UNITED STATES PATENT OFFICE 2,567,802

METHOD OF RECLAIMING FIBER-REINFORCED RUBBER

Richard K. Carr, Wadsworth, and Earl B. Busenburg, Akron, Ohio, assignors to The B. F. Goodrich Company, New York, N. Y., a corporation of New York No Drawing. Application January 21, 1949, Serial No. 72,058

8 Claims. (Cl. 260—711)

This invention relates to a method of reclaiming fiber-reinforced vulcanized rubber compositions and is particularly concerned with a method of rapidly degrading fibrous reinforcement incorporated in vulcanized scrap rubber which is reclaimed by the digestor process.

Vulcanized scrap rubber is commonly reclaimed by either the heater process wherein the ground scrap is treated with a softening agent and heated in shallow pans in a heated chamber until plastic or by the digestor process wherein the ground scrap is immersed in a heated aqueous medium until the scrap becomes plastic; in the latter process also a small amount (1 to 20% by weight of the rubber) of reclaiming or softening agent is preferably employed.

A large percentage of the scrap rubber which is reclaimed contains fibrous reinforcement, usually in the form of either textile cord or fabric. It is necessary in order to obtain a usable reclaimed product that this fibrous material either be removed before the scrap rubber is reclaimed or dissolved or degraded to a non-fibrous condition during the reclaiming operation in order to obtain a satisfactory product. Most of such fiber-reinforced scrap rubber is usually reclaimed by means of the digestor process, using as the aqueous medium a dilute aqueous solution of sodium hydroxide or of a metallic chloride such as zinc chloride, calcium chloride, or the like, together with a reclaiming oil.

Such solutions produce a satisfactory defibered product but the time of digestion is unduly long. Ordinarily, with suitable reclaiming agents, the vulcanized scrap can be sufficiently plasticized in a period of about 4 hours or less but the scrap is not sufficiently defibered unless treated for a period of from 8 to 24 hours. It is not feasible to employ a more concentrated defibering agent because of possible deleterious effects on the rubber or on the vessel in which the process is carried out and the necessity of repeatedly washing the reclaimed scrap to remove the defibering agent, as well as the excessive cost of providing the necessarily large volume of defibering solution.

It is, therefore, an object of this invention to provide a method of defibering fiber-reinforced vulcanized rubber by the digestor process in a greatly shortened time with an economical use of treating materials, and to provide a method of reclaiming such fiber-reinforced vulcanized rubber to produce a high quality reclaimed product containing but a small percentage of material retaining fibrous character. Other objects will be apparent from the description which follows.

We have discovered that fiber-reinforced vulcanized rubber is reclaimed and the fibrous material therein is substantially destroyed by the method comprising subjecting vulcanized scrap rubber while in a dry and comminuted condition to heated vapors of a mineral acid to degrade partially the fibrous reinforcement, and thereafter digesting the thus treated scrap in a heated aqueous medium for a time sufficient to insure that the fibrous material is substantially dissolved in the aqueous medium or reduced to a non-fibrous character without the necessity of mechanically reducing the degraded fiber to a powdered condition.

The method in accordance with this invention preferably comprises grinding fiber-reinforced vulcanized rubber scrap to a degree of fineness of the order of 2 to 5 mesh so that portions of substantially all of the fibers are exposed. This ground scrap is then subjected at atmospheric pressure to the heated vapors of a constant boiling mixture of water and a mineral acid for a period from 5 seconds to 5 minutes with the ground scrap in a dispersed condition, whereby substantially all of the surface of the scrap is in contact with the vapors. Although use of a constant boiling acid solution is one of the most convenient ways of obtaining the acid gas or vapor for treating the ground scrap, acid gas or vapor from any other source may also be employed with like results. Even substantially dry hydrogen chloride obtained by reacting hydrogen with chlorine may be used since there is ordinarily sufficient residual moisture in the scrap to cause ionic dissociation of the hydrogen chloride and produce the desired effect upon the fiber. The scrap is preferably heated at a temperature of 70° to 250° C. during treatment, or more desirably at a temperature of 100° to 175° C. If desired, a salt which decomposes on heating to liberate an acid, such as ammonium chloride, may be mixed with the ground scrap and used as the source of the acid vapors.

The ground scrap is then removed from contact with the acid vapors, at which time the scrap is essentially dry (i. e., the original scrap contains from 6% to 10% moisture and the treated scrap contains from 2% to 15% moisture by weight), only slightly acidic (i. e., containing from 0.1% to 0.5% mineral acid by weight), and contains the fibrous material still in a fibrous condition, in which condition, depending upon the length of treatment, the fibers will vary from those having little apparent reduction in tensile strength to fibers which are friable and which can be mechanically reduced to powder.

This acid-treated scrap rubber which has undergone no reaction other than the degradation or partial degradation of the fibrous reinforcement is then placed in a digestor or autoclave and covered with an aqueous medium which may be water alone, a dilute aqueous solution of sodium hydroxide (e. g. 2 to 8% by weight) or a dilute aqueous solution of zinc chloride (e. g. 0.5 to 5% by weight), or similar well-known digestor solution. Reclaiming agents are provided and adjusted to plasticize the rubber in the desired digestion cycle. The reclaiming or softening agents which may be used include any of the conventional materials commonly used for this purpose and are well known to those skilled in the art. Of the many materials commercially available the thiophenols such as xylyl mercaptan, beta-naphthyl mercaptan, and the like are particularly effective although materials of widely different chemical properties such as the zinc salt of phenyl hydrazine are also extensively used. The particular reclaiming agent used is not important so far as this invention is concerned since it has no effect upon the fiber, nor is the amount of reclaiming or plasticizing agent employed critical. Generally it amounts to 1 to 20% by weight of the rubber, although it is preferred to use only from 1 to 5% by weight of the rubber to reduce cost of the process.

The aqueous medium is then heated at 330° to 400° F., preferably at 360° to 380° F. for a time sufficient to defiber the charge, which time will ordinarily amount to from 2 to 5 hours. At the end of this digesting period, the reclaimed product is similar in properties to the best digestor reclaim heretofore available even after treatment for a period three or four times as long and contains, in the case of rubber reinforced with cotton cord, less than 5% by weight of cellulosic material and usually less than 2% cellulosic material by weight.

The method of reclaiming in accordance with this invention is applicable for reclaiming any vulcanized polymeric organic rubber material or composition, whether crude or synthetic, which is commonly reclaimed by a digestor process. Thus, the rubbery compositions which may be reclaimed by means of this invention include any of the well-known sulfur-vulcanized rubbery compositions including as the rubbery constituent thereof any of the crude rubbers (that is, the naturally-occurring rubbers) such as caoutchouc and the like, or any of the synthetic rubbery materials such as the polymers of butadiene, isoprene, piperylene, isobutylene and similar ethylenic monomers as well as copolymers of these and similar materials with each other or with such well-known copolymerizable monomeric materials as styrene, acrylonitrile, methcrylonitrile, methyl acrylate, methyl methacrylate, ethyl acrylate, 2-vinyl pyridine and the like, or mixtures of any of these or similar materials with each other in amounts and proportions in accordance with conventional rubber compounding practices.

The rubbery compositions within the scope of this invention are those vulcanized compositions having incorporated therein fibrous reinforcement in the form of fibers, textile cord, textile fabric or any like form of fibrous reinforcement. The composition may, of course, include, in addition to the rubbery constituent and the fibrous reinforcing material, any of the well-known compounding ingredients for rubbery material such as fillers, reinforcing agents, softeners, antioxidants, and the like in amounts and proportions in accordance with well-known rubber compounding practices.

The invention is applicable for reclaiming rubbery compositions reinforced with any fibrous material subject to degradation by vapors of a mineral acid. It is particularly applicable where the fibrous material comprises a cellulosic material such as cotton, rayon, ramie, manila hemp, sisal hemp, wood, jute and the like. The amount of such fibrous reinforcement will vary widely depending upon the source of the scrap rubber but the average fiber-reinforced scrap rubber will contain from 25–50% by weight of cellulosic material based on the total weight of the scrap. A usable digestor reclaimed product must contain less than 5% by weight of cellulosic material and preferably less than 2% by weight of such material.

Ground vulcanized rubbery compositions are treated in accordance with this invention by first subjecting the ground composition containing the fiber to vapors of a mineral acid at atmospheric pressure. The preferred method of treating the scrap prior to digestion consists of heating the scrap to at or near the boiling point of a constant-boiling mixture of water and the particular mineral acid being employed. The heated ground scrap is then subjected to a stream of heated vapors from such constant boiling mixture with the scrap being maintained at the elevated temperature to prevent substantial condensation of the acidic vapors thereon. Preferably the ground scrap is passed through the vapors in a dispersed condition to ensure uniform treatment at all surfaces. This may be readily accomplished by introducing the scrap into an inclined rotating heated tube or cylinder or by employing a closed reaction chamber through which the scrap is moved countercurrently to the stream of acidic vapors by means of a vibrating inclined screen, a perforated belt or by means of a vibrating cascade such as a Grizzly screening machine.

Any of the well-known mineral acids such as hydrochloric, sulfuric, or nitric acid may be employed, with hydrochloric acid being preferred because of its availability, low cost and the low boiling temperature of the constant boiling mixture with water (namely, 109° C. for the mixture containing about 21% HCl by weight). The original mixture of water and acid need not be mixed in the exact proportions necessary to form a constant boiling mixture for, upon heating, the mixture will automatically adjust to constant boiling proportions.

The acidic vapors degrade the cellulosic fiber rapidly without converting any substantial proportion of the cellulose to the hydrochloride. The effect on the fiber when the exposure to vapors is prolonged (i. e., 2 to 5 minutes exposure) is merely to render it friable so that it can be powdered by mechanical means or, upon shorter exposure to the vapors (i. e., 5 seconds to 2 minutes exposure) to reduce somewhat the tensile strength of the fibers. The fibrous character of the cellulosic reinforcement is not changed by the exposure to the acidic vapors nor is any substantial proportion of such cellulose dissolved by the acidic vapors.

The acid-treated scrap rubber is not reclaimed or changed chemically by the acid treatment and the treated product is essentially dry since no substantial amount of the acidic vapor condenses on the scrap during the acid treatment. Furthermore, the residual acid on the treated product amounts only to about 0.05 to 0.5% by weight based on the total weight of the product and is usually present in an amount of about 0.1% by weight so that the scrap rubber need not be washed before it is digested.

The acid-treated scrap is thereafter digested in a heated aqueous medium with plasticizing agents to render the vulcanized rubber plastic. This may be done by immersing the scrap in water alone or by immersing it in an aqueous solution of sodium hydroxide containing from 1-10% by weight of such hydroxide or in a solution of zinc chloride containing from 0.5-3.0% zinc chloride by weight. The digestion is preferably carried out in a closed vessel provided with a steam jacket carrying steam under pressure and the digestion is carried out until the rubber becomes plastic and somewhat tacky as in the conventional digestor process of reclaiming.

The resulting reclaimed product is then washed and dried. It contains less than 5% by weight of cellulosic material.

The invention is best illustrated by specific examples. It will be understood that the examples given are merely illustrative and it is not intended that the scope of the invention be limited thereby.

Example 1

Whole tire scrap containing about 40% by weight of cotton cord and having a mixture of crude rubber and butadiene-styrene copolymer as the rubbery constituents was ground to an average particle size of about 3-4 mesh. The scrap contained 6-10% by weight of moisture and was considered to be essentially dry.

The ground scrap was fed continuously into the upper end of a heated rotating inclined cylinder provided with internal longitudinal vanes which heated the scrap to about 110° C. and moved it down the cylinder in a dispersed condition.

A container filled with a constant boiling mixture of hydrochloric acid and water was heated to provide a continuous stream of acid-bearing vapors which were channeled through the cylinder countercurrent to the movement of the scrap. The total time of passage of the scrap through the cylinder was 3 minutes and the treated product contained about 8% by weight of moisture with an acid concentration of 0.11% by weight. The cotton cord still retained its fibrous character and the cellulose structure was substantially unchanged.

This acid-treated scrap was then immersed in water together with 3%, by weight of the scrap, of xylyl mercaptan in a closed digestor pot heated by steam at 165-175 p. s. i. gauge pressure. After 3 to 4 hours in the digestor using only water as the digestor medium, the rubber had become plastic and the cotton cord was completely disintegrated and more than 98% of the cellulosic material was in the digestor media.

A similar batch of ground scrap was reclaimed by digesting it as described hereinabove without pretreating the scrap with acid vapors. By this latter method, it was necessary to digest the scrap for 24 hours before the reclaimed product had the composition obtained by the method of this invention in about 4 hours.

Example 2

Ground whole tire scrap as in Example 1 was treated with vapors of a constant boiling mixture of hydrochloric acid and water for but 30 seconds according to the method set forth in Example 1. After the acid treatment, the cotton cord retained considerable tensile strength and was not yet rendered friable.

This acid-treated scrap was thereafter digested as in Example 1 in an aqueous solution of zinc chloride (1% by weight zinc chloride). The rubber was reclaimed and the cellulose content of the scrap reduced to less than 2% by weight in 3 to 4 hours. Similar results could be obtained by digesting the scrap in the zinc chloride solution without first treating it with the acid vapors only after a digestion period of at least 8 to 9 hours.

Example 3

Ground whole tire scrap was acid-treated as in Example 1 for 30 seconds and was thereafter digested in an aqueous solution of caustic (4% by weight NaOH). The rubber was rendered plastic and the cellulose content brought to less than 2% by weight in a digestion period of 4 to 5 hours.

Digestion in caustic alone (4% NaOH by weight) gave a reclaimed product of substantially the same properties only after 16 hours of digestion.

That the acceleration of the reclaiming operation is not due merely to residual acid left in the ground scrap after treatment with acid vapor is shown by the fact that omission of the acid vapor treatment and digestion in an aqueous solution containing the acid does not produce the same results. For example, ground whole tire scrap identical with that used in the preceding examples, when digested by heating at a steam pressure of 165-175 p. s. i. in an aqueous solution containing 0.11% hydrochloric acid based on the weight of the scrap, without pretreatment of the scrap with acid vapor, required about eight hours to reach the same condition as the scrap resulting from the process of Example 1. Similar results were obtained when 1.71% of ferric chloride (based on the weight of the scrap) was added to the acid digestor solution.

Similarly, shortened reclaiming cycles are obtained using any of the well-known mineral acids to provide the acidic vapors and using any well-known aqueous digestion media.

Variations and modifications may be effected in the method in accordance with this invention within the spirit and scope of the invention as defined in the appended claims.

We claim:

1. The method of reclaiming a fiber-containing sulfur-vulcanized rubber composition which method comprises subjecting said composition in finely-divided form to mineral acid vapors at a temperature of 70° to 250° C. for a period of time not over 5 minutes while maintaining said composition in an essentially dry condition, removing the composition from said vapors, and heating it for two to five hours in a liquid aqueous medium at a temperature of 330° to 400° F. to render the rubber plastic and remove the fiber therefrom.

2. The method of reclaiming a fiber-containing sulfur-vulcanized rubber composition, which method comprises subjecting said composition in comminuted form to vapors of a constant boiling aqueous solution of a mineral acid at the boiling point of said solution and at atmospheric pressure for a period of time not over 5 minutes while maintaining said composition in an essentrially dry condition, removing said composition from said vapors, and heating it for two to five hours in a liquid aqueous medium at a temperature of 330° to 400° F. to render the rubber plastic and remove the fiber therefrom.

3. The method of reclaiming a vulcanized rubber composition containing cellulosic fiber, which method comprises comminuting said composition, subjecting said comminuted composition at substantially atmospheric pressure to vapors of a constant boiling aqueous solution of a mineral acid at the boiling point thereof for a period of time not over 5 minutes while maintaining said composition in an essentially dry condition, removing said composition from said vapors, and heating it for two to five hours in a liquid aqueous medium at a temperature of 330° to 400° F. to render the rubber plastic and remove the fiber therefrom.

4. The method of reclaiming a sulfur-vulcanized rubber composition containing cellulosic fiber which method comprises subjecting the composition in comminuted form to the vapors of a constant boiling aqueous solution of a mineral acid at the boiling point thereof and at atmospheric pressure for five seconds to five minutes while maintaining said composition in an essentially dry condition, removing said composition from said vapors, said composition containing not over 15% moisture and not over 0.5% mineral acid by weight, and heating it for two to five hours in a liquid aqueous medium at a temperature of 330° to 400° F. in the presence of a reclaiming agent to render the rubber plastic and remove the fiber therefrom.

5. The method of reclaiming a sulfur-vulcanized rubber composition containing cellulosic fiber which method comprises subjecting the composition in comminuted form to the vapors of constant boiling hydrochloric acid at the boiling point thereof and at atmospheric pressure for five seconds to five minutes while maintaining said composition in an essentially dry condition, removing said composition from said vapors, said composition containing not over 15% moisture and not over 0.5% hydrochloric acid by weight, and heating it for two to five hours in a liquid aqueous medium in the presence of a reclaiming agent at a temperature of 330° to 400° F. to render the rubber plastic and remove the fiber therefrom.

6. The method of reclaiming a sulfur-vulcanized rubber composition containing cellulosic fiber which method comprises subjecting the composition in comminuted form to the vapors of constant boiling hydrochloric acid at the boiling point thereof and at atmospheric pressure for five seconds to five minutes while maintaining said composition in an essentially dry condition, removing said composition from said vapors, said composition containing not over 15% moisture and not over 0.5% hydrochloric acid by weight, and heating it for two to five hours in a dilute aqueous sodium hydroxide solution at a temperature of 330° to 400° F. to render the rubber plastic and remove the fiber therefrom.

7. The method of reclaiming a sulfur-vulcanized rubber composition containing cellulosic fiber which method comprises subjecting the composition in comminuted form to the vapors of constant boiling hydrochloric acid at the boiling point thereof and at atmospheric pressure for five seconds to five minutes while maintaining said composition in an essentially dry condition, removing said composition from said vapors, said composition containing not over 15% moisture and not over 0.5% hydrochloric acid by weight, and heating it for two to five hours in a dilute aqueous solution of zinc chloride at a temperature of 330° to 400° F. to render the rubber plastic and remove the fiber therefrom.

8. The method of reclaiming a sulfur-vulcanized rubber composition containing fiber subject to degradation by a mineral acid, which method comprises subjecting said composition in comminuted form to vapors of a mineral acid at 100° to 175° C. while maintaining said composition in an essentially dry condition, removing the composition from said vapors, said composition containing not over 15% moisture and not over 0.5% mineral acid by weight, and heating the composition for two to five hours in a liquid aqueous medium at 360° to 380° F. to render the rubber plastic and remove the fiber therefrom.

RICHARD K. CARR.
EARL B. BUSENBURG.

REFERENCES CITED

The following references are of record in the file of this patent:

UNITED STATES PATENTS

| Number | Name | Date |
|---|---|---|
| 249,970 | Mitchell | Nov. 22, 1881 |
| 823,054 | Koneman | June 12, 1906 |
| 1,196,334 | Chute | Aug. 29, 1916 |
| 1,759,017 | Miller | May 20, 1930 |
| 2,073,916 | Wilson | Mar. 16, 1937 |
| 2,287,095 | Federman | June 23, 1942 |
| 2,498,398 | Dasher | Feb. 21, 1950 |